(12) United States Patent
Kurita et al.

(10) Patent No.: US 11,424,591 B2
(45) Date of Patent: Aug. 23, 2022

(54) LASER DEVICE AND METHOD FOR CONTROLLING WAVEFORM

(71) Applicant: HAMAMATSU PHOTONICS K.K., Hamamatsu (JP)

(72) Inventors: Takashi Kurita, Hamamatsu (JP); Yoshinori Kato, Hamamatsu (JP); Toshiyuki Kawashima, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 431 days.

(21) Appl. No.: 16/469,300

(22) PCT Filed: Nov. 21, 2017

(86) PCT No.: PCT/JP2017/041874
§ 371 (c)(1),
(2) Date: Jun. 13, 2019

(87) PCT Pub. No.: WO2018/110222
PCT Pub. Date: Jun. 21, 2018

(65) Prior Publication Data
US 2020/0106237 A1     Apr. 2, 2020

(30) Foreign Application Priority Data
Dec. 16, 2016   (JP) .............................. JP2016-244434

(51) Int. Cl.
*H01S 3/10*   (2006.01)
*H01S 3/067*   (2006.01)
*H01S 3/08*   (2006.01)

(52) U.S. Cl.
CPC ........ *H01S 3/10007* (2013.01); *H01S 3/0675* (2013.01); *H01S 3/06754* (2013.01); *H01S 3/08086* (2013.01); *H01S 2301/04* (2013.01)

(58) Field of Classification Search
None
See application file for complete search history.

(56) References Cited

U.S. PATENT DOCUMENTS 4,660,205 A * 4/1987 Harter .................... H01S 3/082
                                                                 372/103
4,686,485 A * 8/1987 Goldberg .............. H01S 5/4081
                                                                 359/340

(Continued)

FOREIGN PATENT DOCUMENTS

CN       101842946 A      9/2010
CN       103022862 A      4/2013

(Continued)

OTHER PUBLICATIONS

Yilmaz, T. et al., "Toward a Photonic Arbitrary Waveform Generator using a Modelocked External Cavity Semiconductor Laser", IEEE Photonics Technology Letters, IEEE Service Center, Piscataway, NJ, US, vol. 14, No. 11, Nov. 1, 2002, p. 1608-p. 1610, XP011426924.

(Continued)

*Primary Examiner* — Eric L Bolda
(74) *Attorney, Agent, or Firm* — Faegre Drinker Biddle & Reath LLP

(57) ABSTRACT

A laser device is a laser device that includes an output unit that outputs seed light to a light amplifying unit. The output unit has a light source unit that outputs, as the seed light, rays of light with a plurality of wavelengths lying within a gain range of the light amplifying unit, and a seed light control unit that controls an intensity-time waveform of the seed light output from the light source unit.

9 Claims, 13 Drawing Sheets

(56) References Cited

U.S. PATENT DOCUMENTS

| | | | | |
|---|---|---|---|---|
| 5,600,481 | A * | 2/1997 | Nakabayashi | H04B 10/2912 359/337.13 |
| 6,008,932 | A * | 12/1999 | Luo | H01S 3/1302 359/337 |
| 6,018,536 | A * | 1/2000 | Alphonse | H01S 5/146 372/18 |
| 7,199,924 | B1 * | 4/2007 | Brown | G02B 27/1006 359/556 |
| 2005/0238065 | A1 * | 10/2005 | Shirakawa | H01S 3/2383 372/6 |
| 2006/0257150 | A1 | 11/2006 | Tsuchiya et al. | |
| 2007/0091941 | A1 * | 4/2007 | Mori | H01S 5/065 372/18 |
| 2008/0144677 | A1 * | 6/2008 | Belkin | G01N 21/39 372/20 |
| 2009/0219959 | A1 | 9/2009 | Murison et al. | |
| 2015/0303645 | A1 * | 10/2015 | Palese | G02B 27/10 359/341.1 |

FOREIGN PATENT DOCUMENTS

| | | |
|---|---|---|
| CN | 104868353 A | 8/2015 |
| JP | S58-207321 A | 12/1983 |
| JP | H07-95607 B2 | 10/1995 |
| JP | H07-335960 A | 12/1995 |
| JP | H10-294517 A | 11/1998 |
| JP | 2005-251810 A | 9/2005 |
| JP | 2006-5349 A | 1/2006 |
| JP | 2006-313858 A | 11/2006 |
| JP | 2008-141175 A | 6/2008 |
| JP | 2010-505242 A | 2/2010 |
| JP | 4521538 B2 | 6/2010 |
| JP | 2011-258828 A | 12/2011 |
| JP | 2012-529757 A | 11/2012 |
| JP | 2016-518024 A | 6/2016 |
| WO | WO-2008/037087 A1 | 4/2008 |
| WO | WO-2010/142039 A1 | 12/2010 |
| WO | WO-2014/162209 A2 | 10/2014 |

OTHER PUBLICATIONS

International Preliminary Report on Patentability dated Jun. 27, 2019 for PCT/JP2017/041874.

Saumyabrata Banerjee et al., "100 J-level nanosecond pulsed diode pumped solid state laser," Optics Letters, May 1, 2016, pp. 2089-2092, vol. 41, No. 9.

* cited by examiner

Fig.3
(a)
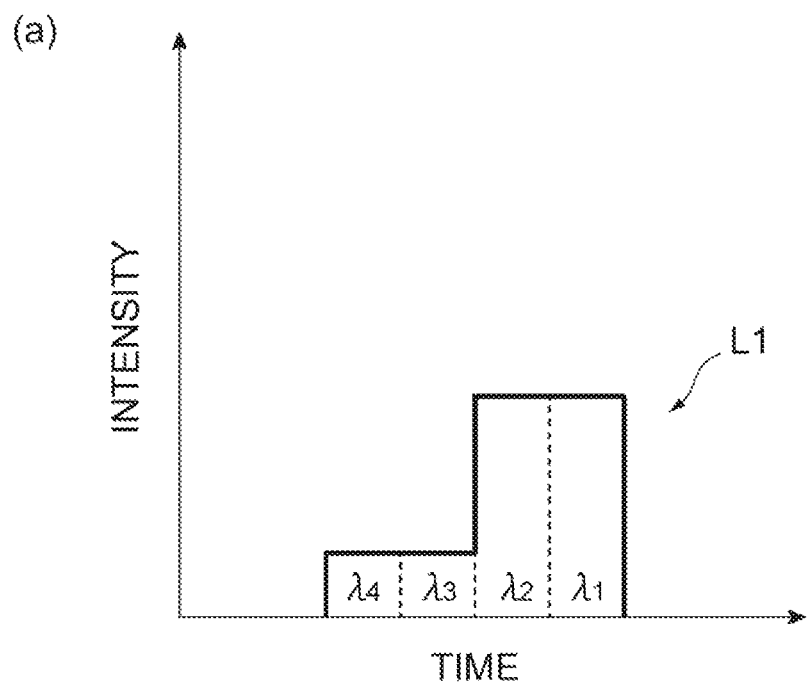
(b)
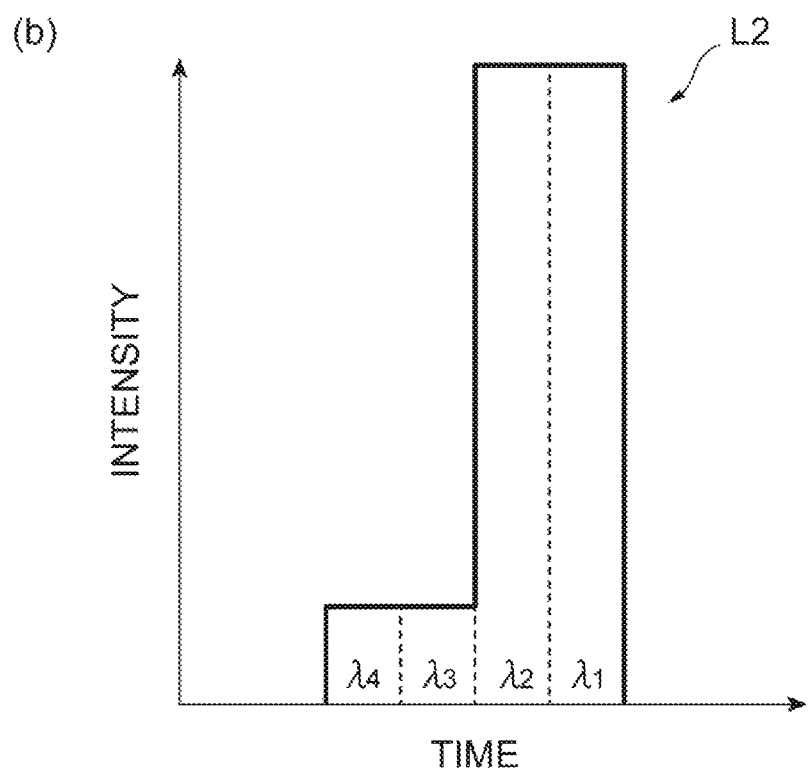

Fig.8
(a)
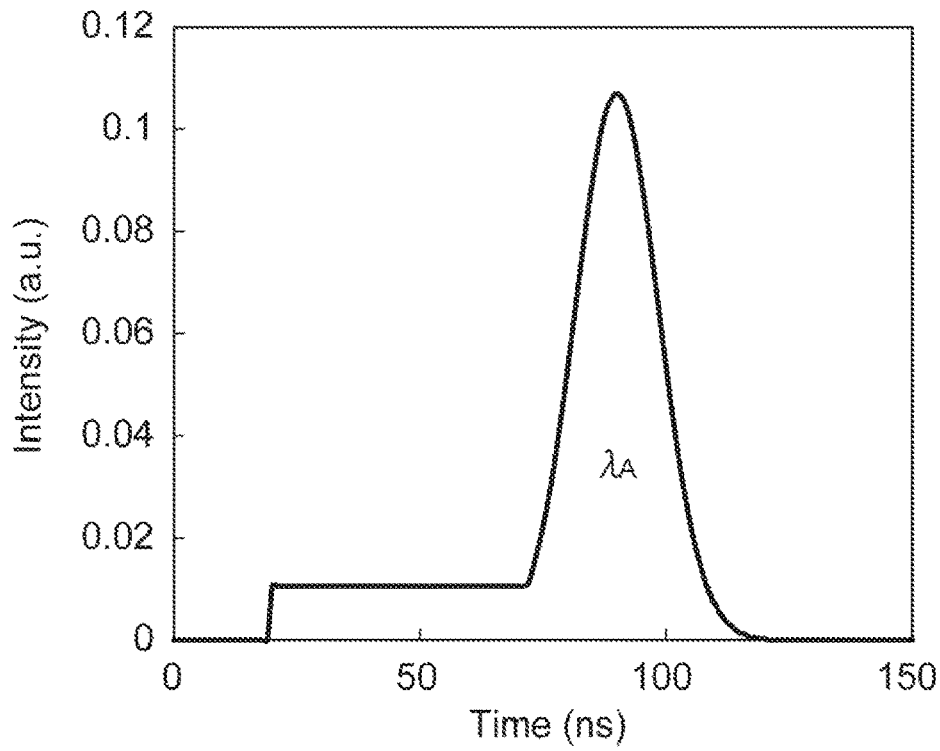
(b)
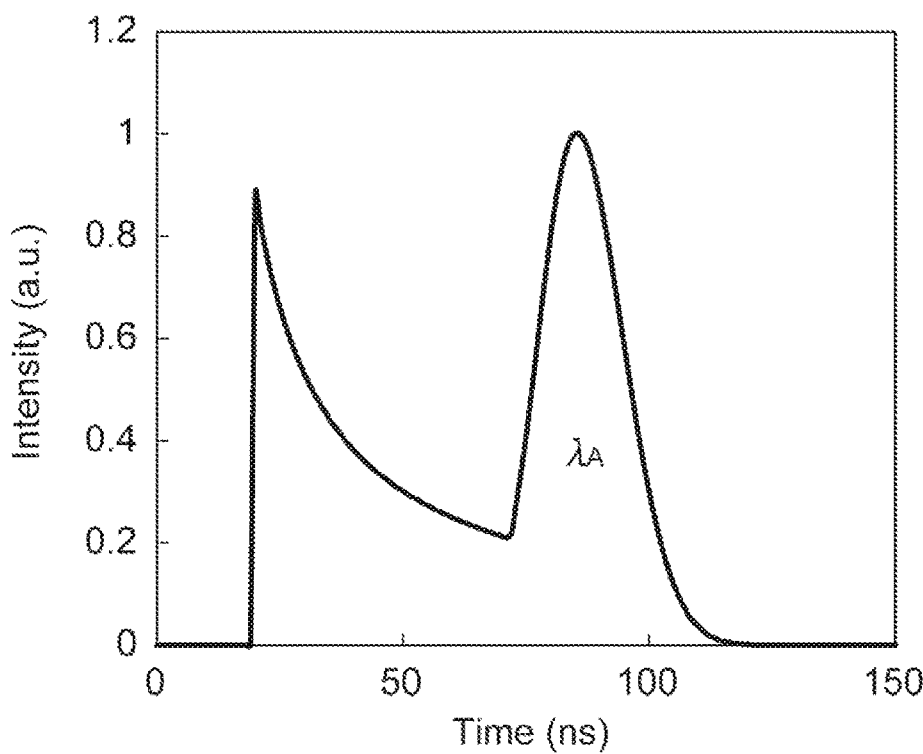

Fig.9
(a)
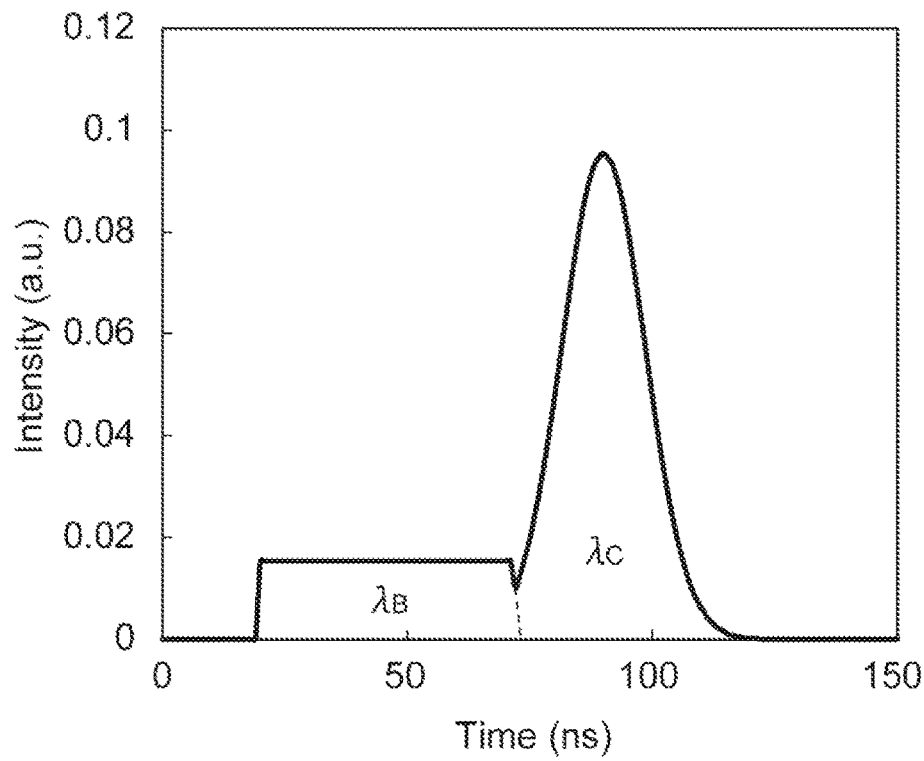
(b)
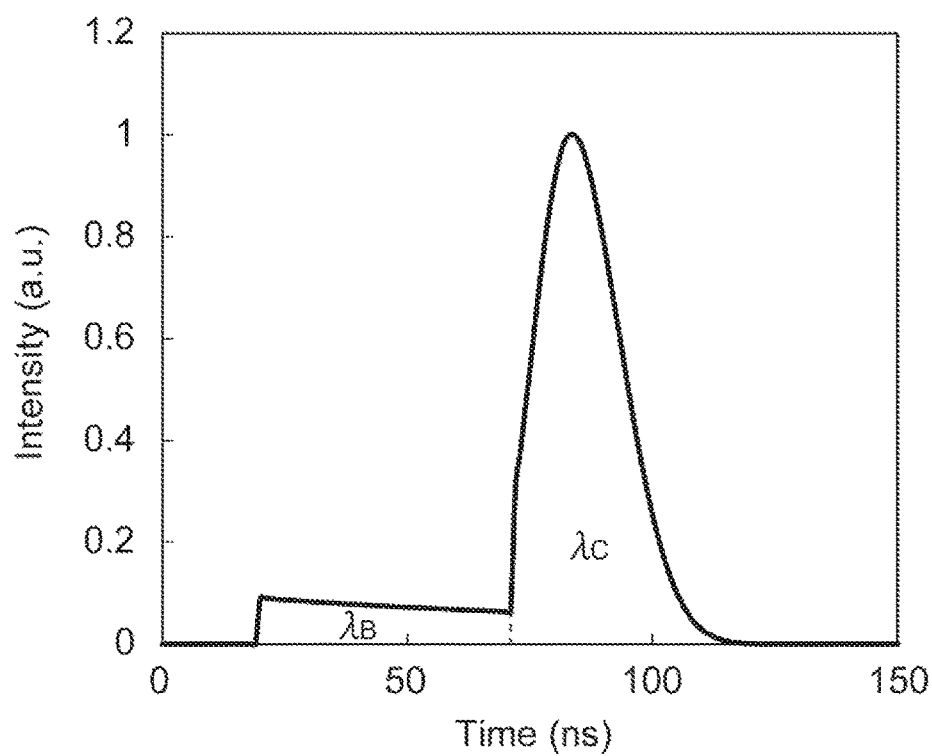

LASER DEVICE AND METHOD FOR CONTROLLING WAVEFORM

TECHNICAL FIELD

The present embodiment relates to a laser device and a method for controlling a waveform.

BACKGROUND ART

Recently, the output power of laser devices has increased, and high power lasers having an energy per pulse exceeding 100 J and having a constant repetition frequency have been developed. As an example of application technologies of a high power laser, there is a laser machining method, which is referred to as laser peening. In laser peening, a surface of a workpiece such as a metal is irradiated with a pulsed laser to generate plasma on the metal surface, and the metal is plastically deformed by using shock waves generated due to the plasma pressure (for example, refer to Patent Literature 1).

When a high power laser is applied, it is required to be controlled to have the intensity-time waveform of an output pulse. For example, in laser peening, it is assumed that the state of shock waves generated on a surface of a workpiece varies due to the intensity-time waveform of a pulse. As an example of technologies of controlling the intensity-time waveform of a pulse, according to Patent Literature 2, Patent Literature 3, and Non-Patent Literature 1, the intensity-time waveform of light (seed light) input to a light amplifying unit or gain characteristics of the light amplifying unit are controlled such that distortion of the intensity-time waveform caused by the light amplifying unit is canceled out.

CITATION LIST

Patent Literature

Patent Literature 1: Japanese Unexamined Patent Publication No. S58-207321
Patent Literature 2: Japanese Examined Patent Publication No. H7-95607
Patent Literature 3: Japanese Unexamined Patent Publication No. H7-335960

Non-Patent Literature

Non-Patent Literature 1: S. Banerjee, et al, "100 J-level nanosecond pulsed diode pumped solid state laser", Optics Letters, Vol. 41, No. 9, May 1, 2016

SUMMARY OF INVENTION

Technical Problem

A light amplifying unit to which seed light is input has gain characteristics with respect to the wavelength. Therefore, generally, seed light having a wavelength with which a gain is at a peak is input to a light amplifying unit. However, in such a technique, a component of seed light, which propagates earlier is significantly amplified due to the high gain. It is difficult to accumulate the energy for enabling amplification to be performed with an equivalent gain in a short period of time after amplification is performed by a light amplifying unit at a high gain. Therefore, a component propagating later can only achieve a gain smaller than a component propagating earlier, thereby resulting in a problem that the intensity-time waveform of amplified light output from the light amplifying unit is significantly distorted with respect to the intensity-time waveform of seed light. Particularly, when the intensity of seed light is amplified with a high amplification degree using a light amplifier, the intensity-time waveform of amplified light is extremely distorted. In the techniques of Patent Literature 2, Patent Literature 3, and Non-Patent Literature 1 described above, the intensity-time waveform can be controlled to a relatively simple extent. However, when seed light is amplified with a high amplification degree, there is concern that the intensity-time waveform of amplified light to be obtained will be insufficiently controlled.

The present embodiment has been made in order to solve the foregoing problems, and an object thereof is to provide a laser device which can obtain amplified light having a desired intensity-time waveform even when amplification is performed with a high amplification degree, and a method for controlling a waveform.

Solution to Problem

According to an aspect of the present embodiment, there is provided a laser device which is a laser device including an output unit configured to output seed light to a light amplifying unit. The output unit has a light source unit configured to output, as the seed light, rays of light with a plurality of wavelengths lying within a gain range of the light amplifying unit, and a seed light control unit configured to control an intensity-time waveform of the seed light output from the light source unit.

In this laser device, rays of light with a plurality of wavelengths lying within the gain range of the light amplifying unit are output as seed light. Light, of components of seed light, with a wavelength distant from a peak of a gain of the light amplifying unit can be input to the light amplifying unit earlier by controlling the intensity-time waveform of seed light including rays of light with a plurality of wavelengths. In addition, light, of the components of seed light, with a wavelength at a peak or in the vicinity of a peak of a gain of the light amplifying unit can be input to the light amplifying unit later. A problem of losing a gain of the light amplifying unit when the component propagating earlier is input to the light amplifying unit is resolved by varying the wavelengths of the component propagating earlier and the component propagating later. Thus, it is possible to obtain amplified light having a desired intensity-time waveform even when amplification is performed with a high amplification degree.

In addition, the laser device may further include a light amplifying unit configured to amplify an intensity of the seed light output from the output unit. In this case, seed light which has been controlled to have an intensity-time waveform with an arbitrary shape by the seed light control unit can be amplified with a high amplification degree.

In addition, the light source unit may be comprising a plurality of light sources configured to respectively output rays of light with the wavelengths included in the seed light, and one or a plurality of multiplexing units configured to generate the seed light by multiplexing rays of light output from the plurality of light sources. Accordingly, rays of light with a plurality of wavelengths lying within the gain range of the light amplifying unit can be generated as seed light, with a simple configuration.

In addition, the light source may be a semiconductor laser, and the seed light control unit may include a temperature control element configured to control a temperature of the semiconductor laser. In this case, the intensity-time waveform of seed light can be accurately controlled.

In addition, the light source may be a solid-state laser, and the seed light control unit may include an output mirror configured to constitute a resonator of the solid-state laser. In this case, the intensity-time waveform of seed light can be accurately controlled.

In addition, the light source may be a fiber laser, and the seed light control unit may include a diffraction grating configured to constitute a resonator of the fiber laser. In this case, the intensity-time waveform of seed light can be accurately controlled.

In addition, the light source may be an injection-locked Q-switched laser, and the seed light control unit may include a temperature control element configured to control a temperature of a seed laser used for oscillating the injection-locked Q-switched laser. In this case, the intensity-time waveform of seed light can be accurately controlled.

In addition, the light source unit may be comprising a single light source configured to output rays of light with a plurality of wavelengths included in the seed light. Accordingly, rays of light with a plurality of wavelengths lying within the gain range of the light amplifying unit can be generated as seed light, with a simple configuration.

In addition, the light source may be a mode-locked laser, and the seed light control unit may include a band-pass filter configured to extract a part of an oscillation spectrum of the mode-locked laser. In this case, the intensity-time waveform of seed light can be accurately controlled.

In addition, according to another aspect of the present embodiment, there is provided a method for controlling a waveform of seed light to a light amplifying unit. The method for controlling a waveform includes outputting, as the seed light, rays of light with a plurality of wavelengths lying within a gain range of the light amplifying unit, and controlling an intensity-time waveform of the seed light.

In this method for controlling a waveform, rays of light with a plurality of wavelengths lying within the gain range of the light amplifying unit are output as seed light. Light, in the components of seed light, with a wavelength distant from a peak of a gain of the light amplifying unit can be input to the light amplifying unit earlier by controlling the intensity-time waveform of seed light including rays of light with a plurality of wavelengths. In addition, light, of the components of seed light, with a wavelength at a peak or in the vicinity of a peak of a gain of the light amplifying unit can be input to the light amplifying unit later. A problem of losing a gain of the light amplifying unit when the component propagating earlier is input to the light amplifying unit is resolved by varying the wavelengths of the component propagating earlier and the component propagating later. Thus, it is possible to obtain amplified light having a desired intensity-time waveform even when amplification is performed with a high amplification degree.

Advantageous Effects of Invention

According to the present embodiment, it is possible to obtain amplified light having a desired intensity-time waveform even when amplification is performed with a high amplification degree.

BRIEF DESCRIPTION OF DRAWINGS

FIG. 3(a) is a view illustrating an example of intensity-time waveforms of seed light, and FIG. 3(b) is a view illustrating an example of intensity-time waveforms of amplified light obtained by amplifying seed light.

FIGS. 8(a) and 8(b) are views illustrating comparative examples of waveform control.

FIGS. 9(a) and 9(b) are views illustrating Examples of waveform control.

DESCRIPTION OF EMBODIMENT

Hereinafter, with reference to the drawings, preferable embodiments of a laser device and a method for controlling a waveform according to aspects of the present embodiment will be described in detail.

[Overview and Overall Configuration of Laser Device]

Figure 1:
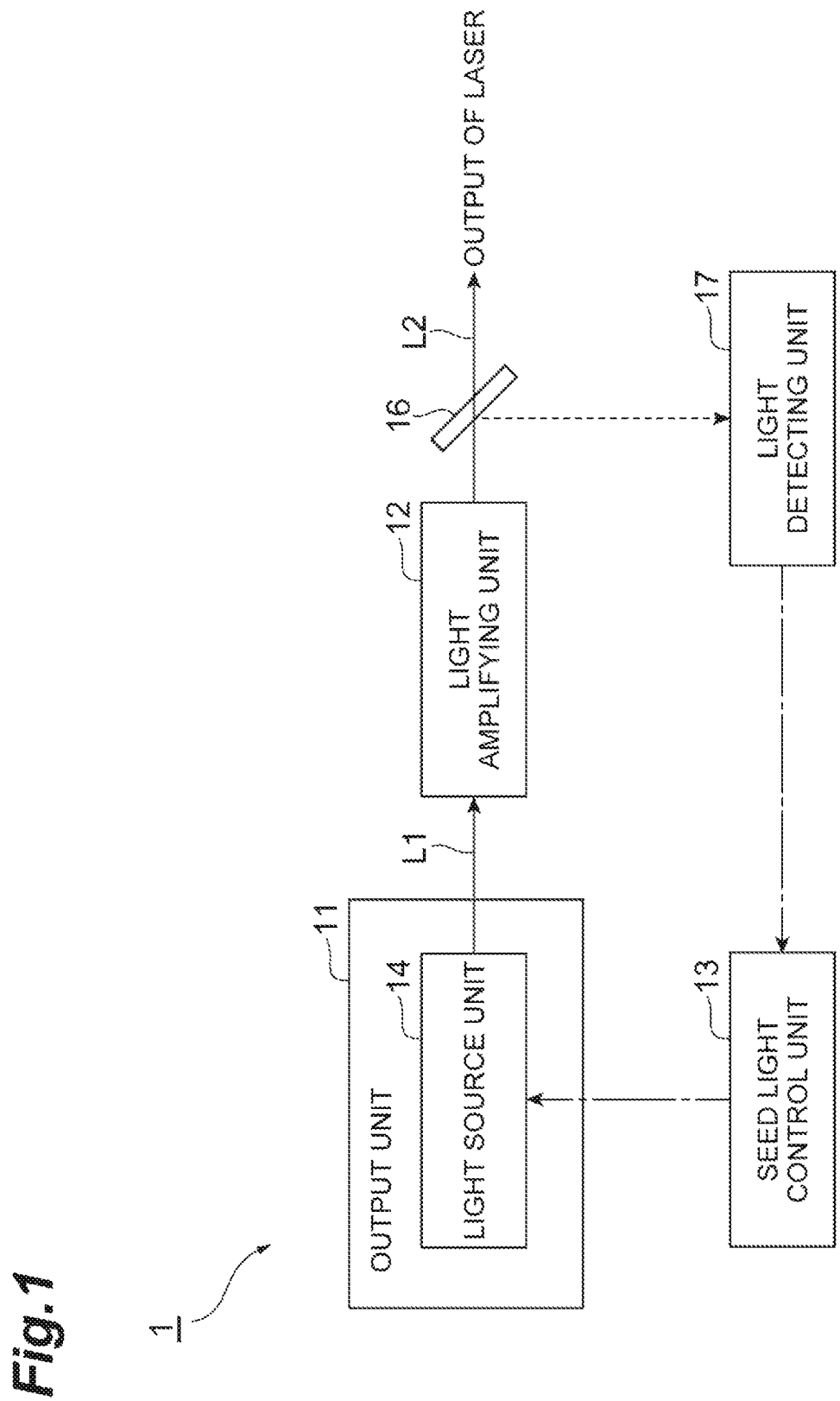
FIG. 1 is a block diagram illustrating an embodiment of a laser device.

FIG. 1 is a block diagram illustrating an embodiment of a laser device. As illustrated in FIG. 1, a laser device 1 is configured to include an output unit 11, a light amplifying unit 12, and a seed light control unit 13. This laser device 1 is a high power laser device that causes the light amplifying unit 12 to amplify seed light L1 output from the output unit 11 and outputs amplified light L2. For example, the laser device 1 is used in a laser machining technology such as laser peening. For example, the laser device 1 amplifies the seed light L1, of which an energy per pulse is less than 1 nJ, to 100 J or higher and can output amplified light with a repetition frequency of approximately 0.1 Hz.

Figure 2:
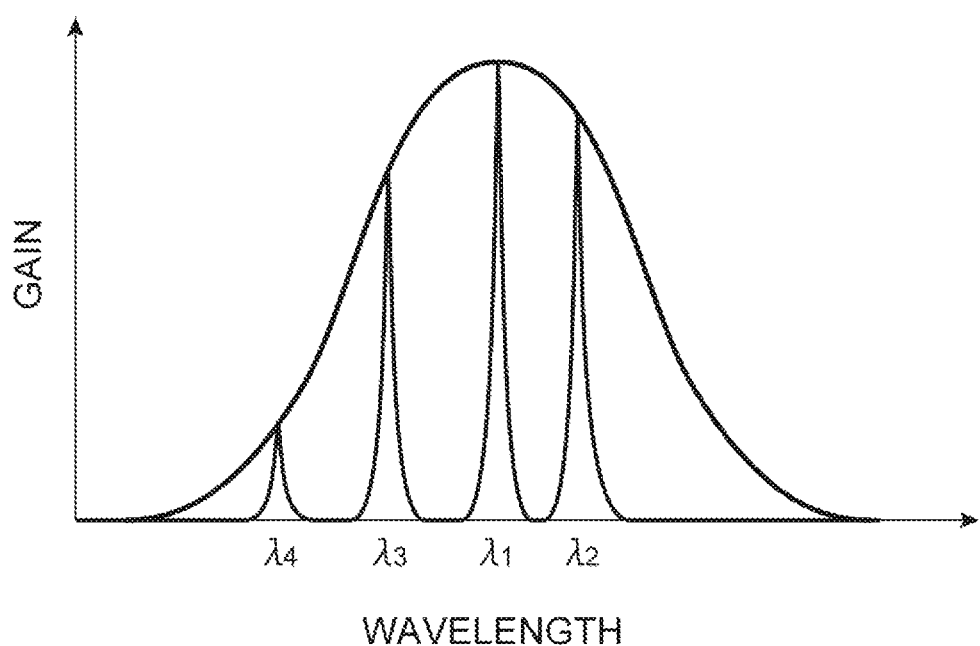
FIG. 2 is a view illustrating a relationship between gain characteristics of an amplifier and wavelengths of light included in seed light.

In this laser device 1, control of the intensity-time waveform of the seed light L1 is executed to suppress distortion of the intensity-time waveform of the amplified light L2 with respect to the intensity-time waveform of the seed light L1 input to the light amplifying unit 12. More specifically, in the laser device 1, as illustrated in FIG. 2, the seed light L1 is generated from rays of light with a plurality of wavelengths lying within a gain range of the light amplifying unit 12. In the example illustrated in FIG. 2, rays of light with four wavelengths of $\lambda_1$, $\lambda_2$, $\lambda_3$, and $\lambda_4$ in order from a wavelength closer to the peak of a gain of the light amplifying unit 12 are used for generating the seed light L1.

FIG. 3(a) is a view illustrating an example of intensity-time waveforms of seed light. In the example of FIG. 3(a), an intensity-time waveform of the seed light L1 has an overall rectangular shape, and the intensity of a component propagating earlier is lower than the intensity of a component propagating later. In addition, the intensity-time waveform of the seed light L1 is temporally divided into four divisions of rays of light with four wavelengths included in the seed light L1. Here, components propagating earlier are constituted of rays of light with wavelengths in the order of $\lambda_4$ and $\lambda_3$ of increasing distance from the peak of a gain of the light amplifying unit 12, and components propagating later are constituted of rays of light with wavelengths in the order of $\lambda_2$ and $\lambda_1$ of increasing closeness to the peak of a gain of the light amplifying unit 12.

FIG. 3(b) is a view illustrating an example of intensity-time waveforms of amplified light obtained by amplifying seed light. When the seed light L1 illustrated in FIG. 3(a) is input to the light amplifying unit 12, rays of light, of components of the seed light L1, with the wavelengths $\lambda_4$ and $\lambda_3$ distant from the peak of a gain of the light amplifying unit 12 are input to the light amplifying unit 12 earlier, and rays of light with the wavelengths $\lambda_2$ and $\lambda_1$ at a peak or in the vicinity of a peak of a gain of the light amplifying unit 12 are input to the light amplifying unit 12 later. In this manner, a problem of losing a gain of the light amplifying unit 12 when the component propagating earlier is input to the light amplifying unit 12 is resolved by varying the wavelengths of the component propagating earlier and the component propagating later. As in the example illustrated in FIG. 3(b), generation of distortion of the intensity-time waveform of the amplified light L2 can be drastically reduced by independently controlling the intensity, the duration, the timing, and the like of the individual wavelength components included in the seed light L1 in accordance with the amplification degree of the light amplifying unit 12, so that it is possible to obtain the amplified light L2 having a desired intensity-time waveform even when amplification is performed with a high amplification degree.

Hereinafter, each of constituent elements of the laser device 1 executing the waveform control described above will be described in detail.

Figure 4:
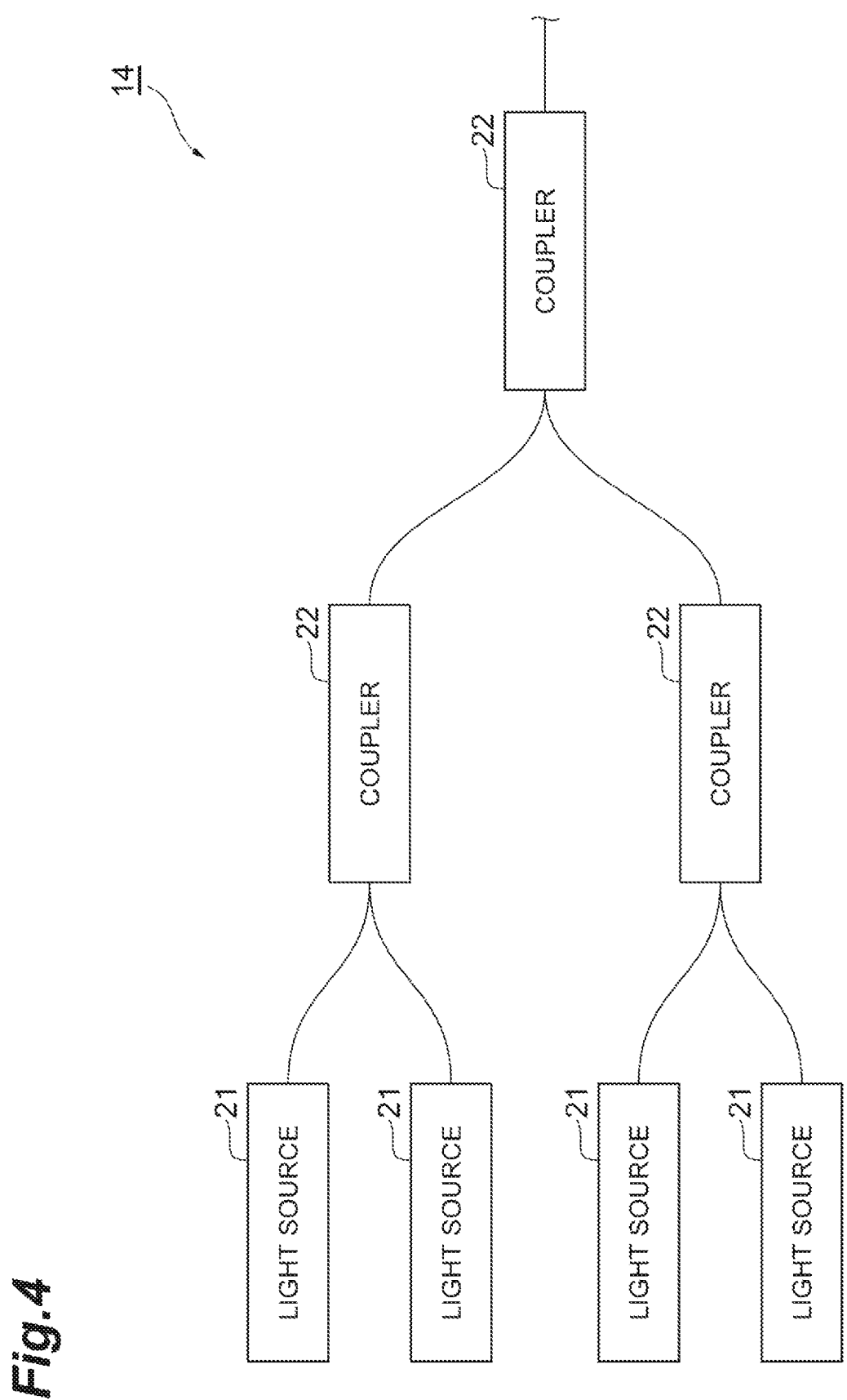
FIG. 4 is a view illustrating an example of a configuration of output units.

As illustrated in FIG. 1, the output unit 11 is a unit that outputs, as the seed light L1, rays of light with a plurality of wavelengths lying within the gain range of the light amplifying unit 12, and the output unit 11 has a light source unit 14. As illustrated in FIG. 4, the light source unit 14 is constituted of a plurality of light sources 21 (here, four) respectively outputting rays of light with the wavelengths included in the seed light L1, and one or a plurality of couplers (multiplexing units) 22. For example, each of the couplers 22 is a one-to-one coupler.

Figure 5:
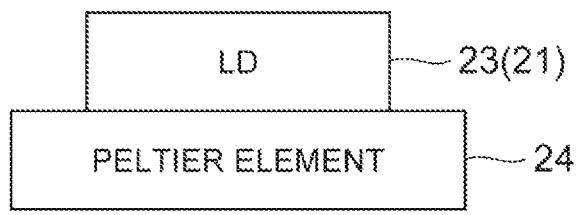
FIG. 5 is a view illustrating an example of a configuration of a light source.

As illustrated in FIG. 5, for example, each light source 21 is a distribution-feedback semiconductor laser 23. The intensity and the timing of light output from each of the light sources 21 are controlled based on a control signal from the seed light control unit 13. In addition, regarding the control of the wavelength of light output from each of the light sources 21, a Peltier element (temperature control element) 24 is attached to each of the light sources 21. The Peltier element 24 constitutes a part of the seed light control unit 13 controlling the intensity-time waveform of the seed light L1 output from the light source unit 14. An operation of the Peltier element 24 is controlled based on a control signal from the seed light control unit 13.

When the semiconductor laser 23 is used as the light source 21, the wavelength of light output from the semiconductor laser 23 has temperature dependency. Therefore, the wavelength of light output from the semiconductor laser 23 can be controlled by controlling the temperature of the semiconductor laser 23 using the Peltier element 24. The wavelength of light output from the semiconductor laser 23 at room temperature (25° C.) is approximately 1064.9 nm, and the amount of wavelength change per temperature change of 1° C. is approximately 0.15 nm. Rays of light with a plurality of wavelengths lying within the gain range of the light amplifying unit 12 are output from the output unit 11 by causing the couplers 22 to multiplex rays of light from the light sources 21 subjected to temperature control by the Peltier element 24.

Figure 6:
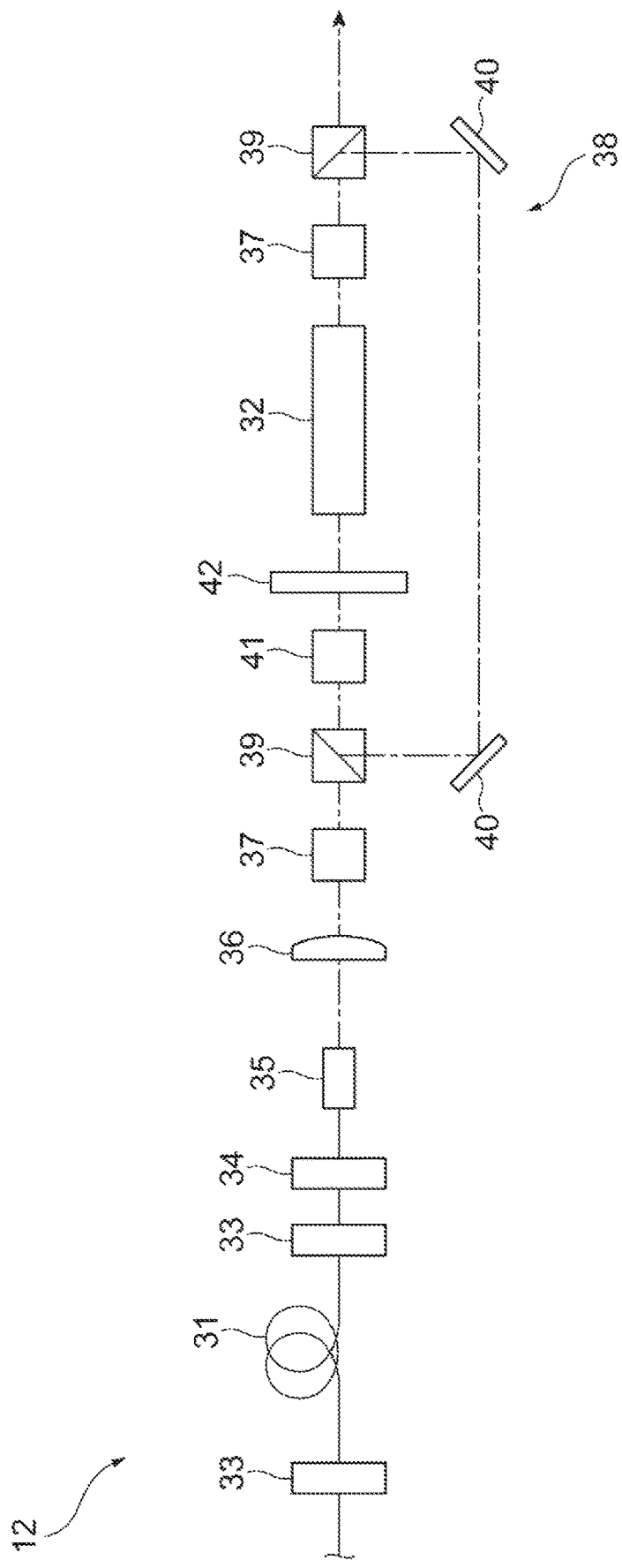
FIG. 6 is a view illustrating an example of a configuration of a light amplifying unit.

The light amplifying unit 12 is a unit that amplifies the intensity of the seed light L1 output from the output unit 11 and is configured to include a single stage or multi-stage light amplifier. In the present embodiment, as illustrated in FIG. 6, the light amplifying unit 12 has an optical fiber amplifier 31, a solid-state amplifier 32, and an excitation light source (not illustrated) constituted of optical fibers. For example, the optical fiber amplifier 31 is constituted by adding, as a gain medium, a rare earth element such as ytterbium (Yb) to at least a part of cores of optical fibers. Isolators 33 are optically connected to portions in front and behind the optical fiber amplifier 31. In addition, a band-pass filter 34 having a transmission band in accordance with the gain characteristics of solid-state amplifier 32 is optically connected to a portion in the rear stage of the rear isolator 33. Light which has passed through the band-pass filter 34 is emitted from a connector 35 and is collimated by a collimator lens 36, thereby being incident on the solid-state amplifier 32 side.

For example, the solid-state amplifier 32 has, as a gain medium, glass to which a rare earth element such as Nd is added or YAG to which a rare earth element such as Nd is added. Similar to the optical fiber amplifier 31, isolators 37 are optically connected to portions in front and behind the solid-state amplifier 32. In addition, a loop optical system 38 in which the solid-state amplifier 32 performs amplification multiple times is provided while covering a range including portions in front and behind the solid-state amplifier 32. For example, the loop optical system 38 is configured to include a pair of polarization beam splitters 39 and 39, a pair of mirrors 40 and 40, an electro-optical modulator 41, and a $\lambda/2$ wavelength plate 42. When light is incident on the solid-state amplifier 32 from the optical fiber amplifier 31, the solid-state amplifier 32 and the loop optical system 38 amplify the light multiple times in cooperation with each other. Then, the light becomes the amplified light L2 and is output to the outside from the laser device 1.

As illustrated in FIG. 1, a part of the amplified light L2 is guided to a light detecting unit 17 by a mirror 16 such that the intensity-time waveform of the amplified light L2 is monitored. As the light detecting unit 17, for example, a photodiode or a bi-planar photoelectric tube is used. The light detecting unit 17 detects a part of the amplified light L2 and outputs detection result information to the seed light control unit 13.

The seed light control unit 13 is a unit that controls the intensity-time waveform of the seed light L1 output from the light source unit 14. Physically, the seed light control unit 13 is a computer configured to include a memory such as a RAM and a ROM, a processor (computation circuit) such as a CPU, a communication interface, a storage unit such as a hard disk, and a display unit such as a display. Examples of the computer include a personal computer, a cloud server, and a smart device (a smartphone, a tablet terminal, and the like). The computer executes a function of controlling the intensity-time waveform of the seed light L1 by causing the CPU to execute a program stored in the memory.

More specifically, the seed light control unit 13 receives an input regarding target setting for the intensity-time waveform of the amplified light L2 and sets the intensity-time waveform of the seed light L1 and wavelength divisions (refer to FIG. 3(a)) based on the input target setting (hereinafter, a set waveform will be referred to as a "target waveform"). In addition, the seed light control unit 13 receives detection result information output from the light detecting unit 17 and outputs a control signal to the light source unit 14 based on the detection result information such that the intensity-time waveform of the amplified light L2 approximates the target intensity-time waveform, thereby controlling the intensity, the timing, and the wavelength of light output from each of the light sources 21.

[Operation of Laser Device]

Figure 7:
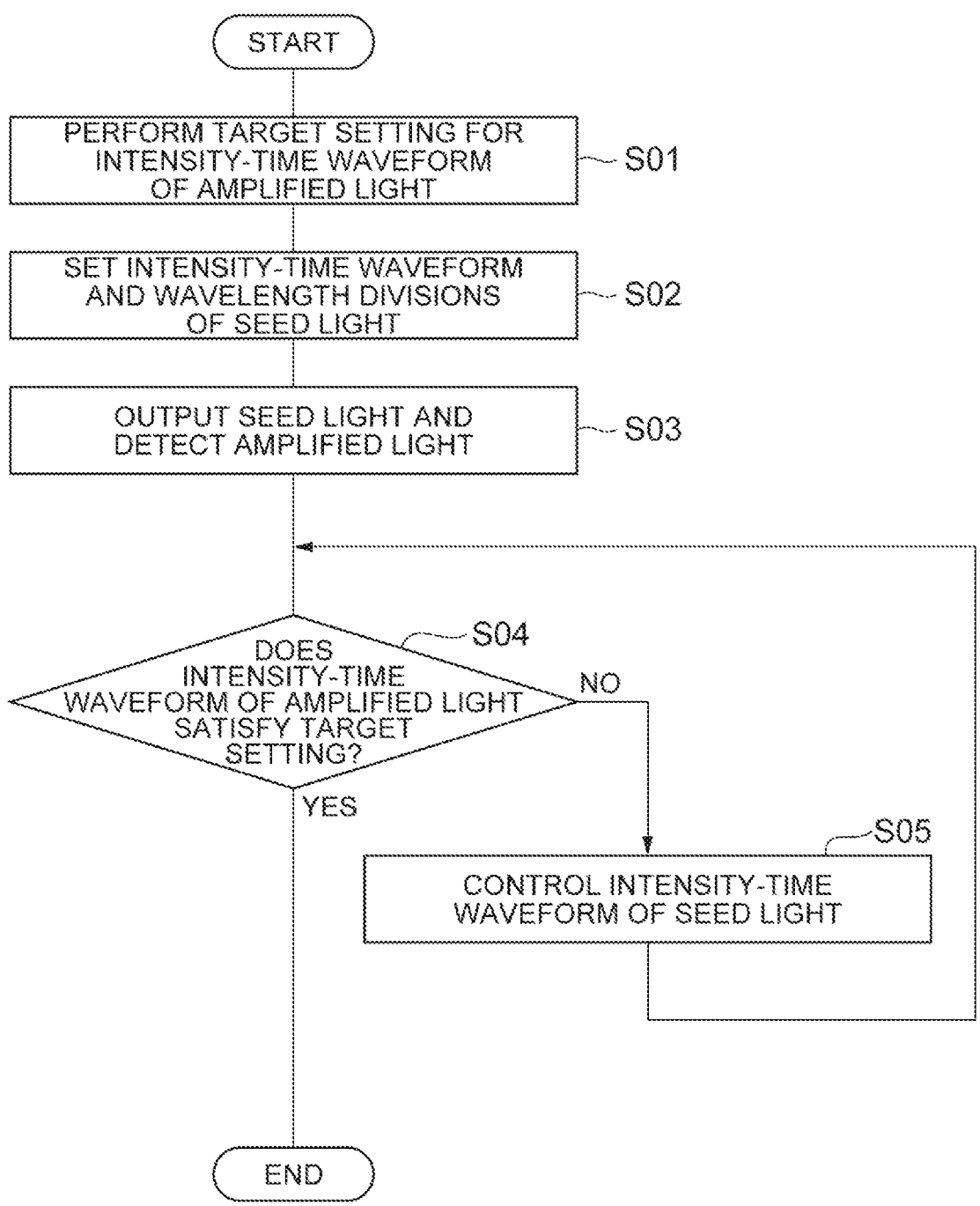
FIG. 7 is a flowchart illustrating an operation of the laser device illustrated in FIG. 1.

Next, an operation of the laser device 1 will be described. FIG. 7 is a flowchart illustrating an operation of the laser device. As illustrated in FIG. 7, in the laser device 1, first, target setting for the intensity-time waveform of the amplified light L2 is performed (Step S01). Next, based on the target waveform of the amplified light L2, the intensity-time waveform of the seed light L1 and the wavelength divisions are set (Step S02). For example, the intensity-time waveform of the seed light L1 is set to have a figure similar to the target waveform of the amplified light L2. In addition, the wavelength divisions of the seed light L1 can be arbitrarily set. However, as an example, the wavelength division is set to be temporally earlier based on the point of inflection of the intensity-time waveform of the seed light L1, when the wavelength is farther from the peak of a gain of the light amplifying unit 12. In the example illustrated in FIG. 3(a), the wavelength divisions of the seed light L1 do not overlap each other, but the wavelength divisions may partially overlap each other.

After the seed light L1 is set, the seed light L1 is output from the output unit 11, and a part of the amplified light L2 output from the light amplifying unit 12 is detected by the light detecting unit 17 (Step S03). In the initial stage state, all of the wavelengths of rays of light of the light sources 21 constituting the seed light L1 may coincide with the peak of a gain of the light amplifying unit 12. Next, it is determined whether or not the intensity-time waveform of the detected amplified light L2 satisfies the target setting (Step S04). For example, the determination is executed by the seed light control unit 13 based on a threshold of an error between standardized values of the target waveform of the amplified light L2 and the intensity-time waveform being monitored.

In Step S04, when it is determined that the intensity-time waveform of the detected amplified light L2 does not satisfy the target setting, the intensity-time waveform of the seed light L1 is controlled (Step S05). That is, a control signal is output to the light source unit 14 such that the intensity-time waveform of the amplified light L2 approximates the target intensity-time waveform, and the intensity, the timing, and the wavelength of light output from each of the light sources 21 are controlled. In Step S04, when it is determined that the intensity-time waveform of the detected amplified light L2 satisfies the target setting, waveform-control processing ends.

[Specific Example of Waveform Control]

Subsequently, a specific example of waveform control of the seed light L1 will be described. FIG. 8 is a view illustrating comparative examples of waveform control. In the comparative examples, a single semiconductor laser 23 was used as the light source 21, and the temperature of the semiconductor laser 23 was controlled by the Peltier element 24 such that the oscillation wavelength $\lambda_A$ became 1064.2 nm in accordance with the peak of a gain of the light amplifying unit 12 which was 1064.2 nm. That is, in the comparative examples, the seed light L1 was generated with a single wavelength $\lambda_A$. The energy per pulse of the seed light L1 was set to 2.8 nJ. FIG. 8(a) illustrates the intensity-time waveform of the seed light L1, the component propagating earlier formed a rectangular shape having a relatively low intensity, and the component propagating later formed a Gaussian shape having a relatively high intensity.

FIG. 8(b) is a view illustrating the intensity-time waveform of the amplified light L2 obtained by the light amplifying unit 12 amplifying the seed light L1 in the comparative examples. The amplification degree was approximately 5.8× $10^8$, and the energy per pulse of the amplified light L2 was approximately 1.6 J. On the other hand, in the comparative examples, since the seed light L1 was generated with the single wavelength $\lambda_A$, there was a problem that the component propagating earlier was significantly amplified due to the high gain and the component propagating later could only obtain a gain smaller than the component propagating earlier. Therefore, in the intensity-time waveform of the seed light L1, a portion which forming a rectangular shape in the intensity-time waveform of the amplified light L2 resulted in a significant distortion laying a steep peak.

FIG. 9 is a view illustrating Examples of waveform control. In Examples, a dual semiconductor laser 23 was used as the light source 21, and the temperature of the semiconductor laser 23 was controlled by the Peltier element 24 such that one oscillation wavelength $\lambda_B$ became 1064.5 nm and the other oscillation wavelength $\lambda_C$ became 1063.9 nm in accordance with the peak of a gain of the light amplifying unit 12 which was 1064.2 nm. Similar to the comparative examples, the energy per pulse of the seed light L1 was set to 2.8 nJ. As illustrated in FIG. 9(a), the intensity-time waveform of the seed light L1 formed a shape similar to that in the comparative examples but differed from that in the comparative examples in that a portion with a rectangular shape propagating earlier was generated by light with the wavelength $\lambda_B$ and a portion with a Gaussian shape propagating later was generated by light with the wavelength $\lambda_C$.

FIG. 9(b) is a view illustrating the intensity-time waveform of the amplified light L2 obtained by the light amplifying unit 12 amplifying the seed light L1 in Examples. The amplification degree was approximately 5.0×$10^8$, the energy per pulse of the amplified light L2 was approximately 1.4 J. In Examples, light with the wavelength $\lambda_B$ distant from the peak of a gain of the light amplifying unit 12 was input to the light amplifying unit 12 earlier, and light with the wavelength $\lambda_C$ different from the wavelength $\lambda_B$ was input to the light amplifying unit 12 later. In this manner, a problem of losing a gain of the light amplifying unit 12 when the component propagating earlier is input to the light amplifying unit 12 is resolved by varying the wavelengths of the component propagating earlier and the component propagating later. Accordingly, distortion of the intensity-time waveform of the amplified light L2 is significantly improved compared to that in the comparative examples, and it is possible to obtain the amplified light L2 having an intensity-time waveform with a shape substantially equivalent to the intensity-time waveform of the seed light L1.

As described above, in the laser device 1, rays of light with a plurality of wavelengths lying within the gain range of the light amplifying unit 12 are output as the seed light L1, and the intensity-time waveform of the seed light L1 is controlled. Accordingly, it is possible to obtain the amplified light L2 having a desired intensity-time waveform even when amplification is performed with a high amplification degree. In the present embodiment, the laser device 1 includes the light amplifying unit 12 that amplifies the intensity of the seed light L1 output from the output unit 11. Accordingly, seed light which has been controlled to have an intensity-time waveform with an arbitrary shape by the seed light control unit 13 can be amplified by the light amplifying unit 12 with a high amplification degree.

In addition, in the present embodiment, the light source unit 14 is constituted of a plurality of light sources 21 that respectively output rays of light with the wavelengths included in the seed light L1, and one or a plurality of couplers 22 that generate the seed light L1 by multiplexing rays of light output from the plurality of light sources 21. Accordingly, rays of light with a plurality of wavelengths lying within the gain range of the light amplifying unit 12 can be generated as the seed light L1, with a simple configuration. Moreover, in the present embodiment, the light source 21 is the semiconductor laser 23, and the seed light control unit 13 includes the Peltier element 24 that controls the temperature of the semiconductor laser 23. Accordingly, the intensity-time waveform of the seed light L1 can be accurately controlled.

Modification Example

The present embodiment is not limited to the foregoing embodiment. For example, in the foregoing embodiment, the light amplifying unit 12 is constituted by combining the optical fiber amplifier 31 and the solid-state amplifier 32. However, the light amplifying unit 12 may be constituted by combining a plurality of solid-state amplifiers 32. In addition, in the foregoing embodiment, the semiconductor laser 23 has been described as an example of a plurality of light sources 21 constituting the light source unit. However, the light source 21 is not limited thereto.

Figure 10:
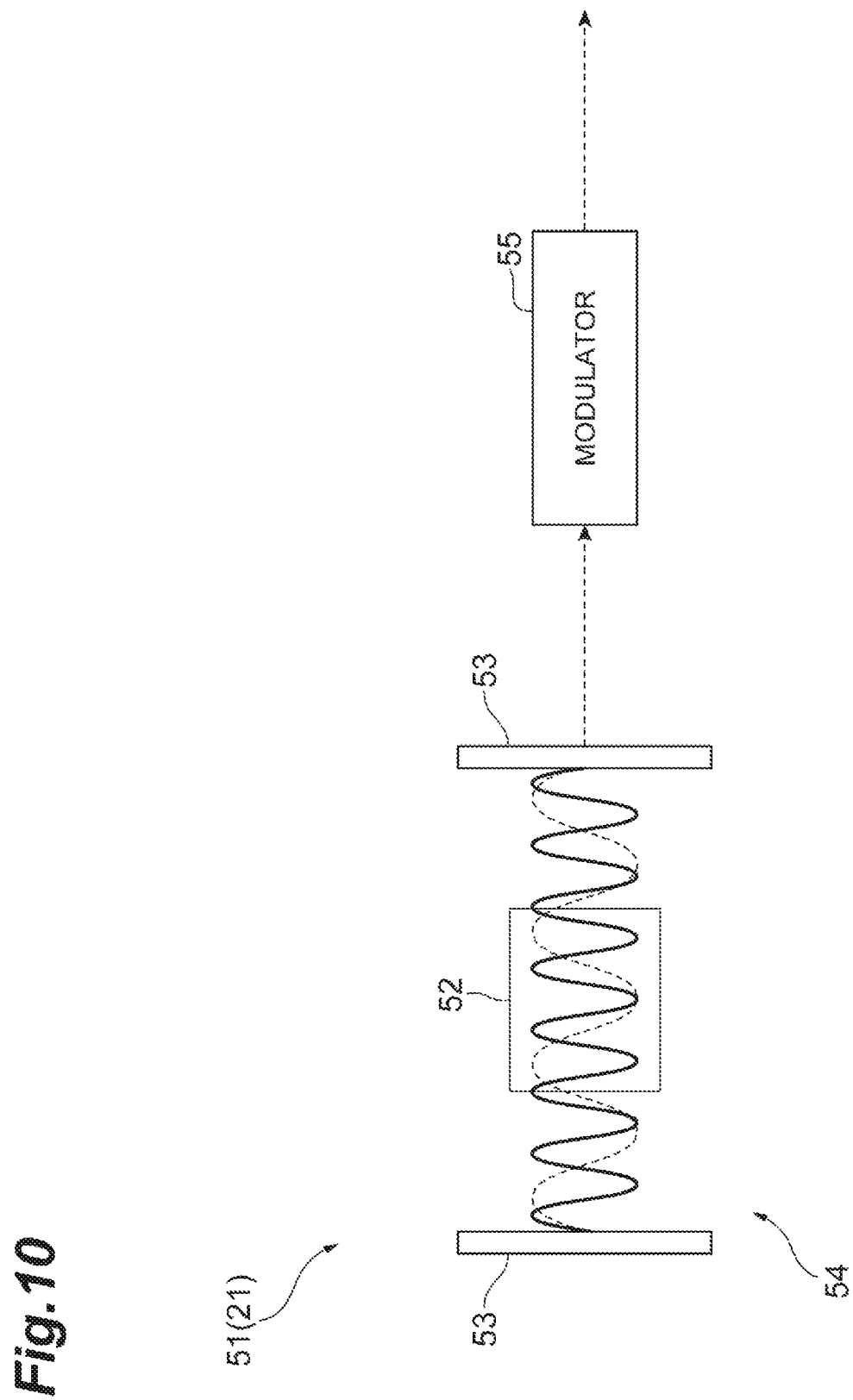
FIG. 10 is a view illustrating a modification example of a configuration of a light source.

For example, as illustrated in FIG. 10, the light source 21 may be a solid-state laser 51 having a resonator 54 in which a gain medium 52 is interposed between resonator mirrors 53 and 53 (an excitation light source is not illustrated). In this case, the resonator mirror 53 on the output side for laser light constitutes a part of the seed light control unit 13. Rays of laser light having wavelengths different from each other within the gain range of the light amplifying unit 12 can be respectively output from the light sources 21 by varying the wavelength dependency of the coefficient of transmission of the resonator mirror 53 on this output side for each of the light sources 21. A modulator such as an electro-optical modulator or an acousto-optical modulator is disposed in the rear stage of the solid-state laser 51, so that out laser light is pulsed.

Figure 11:
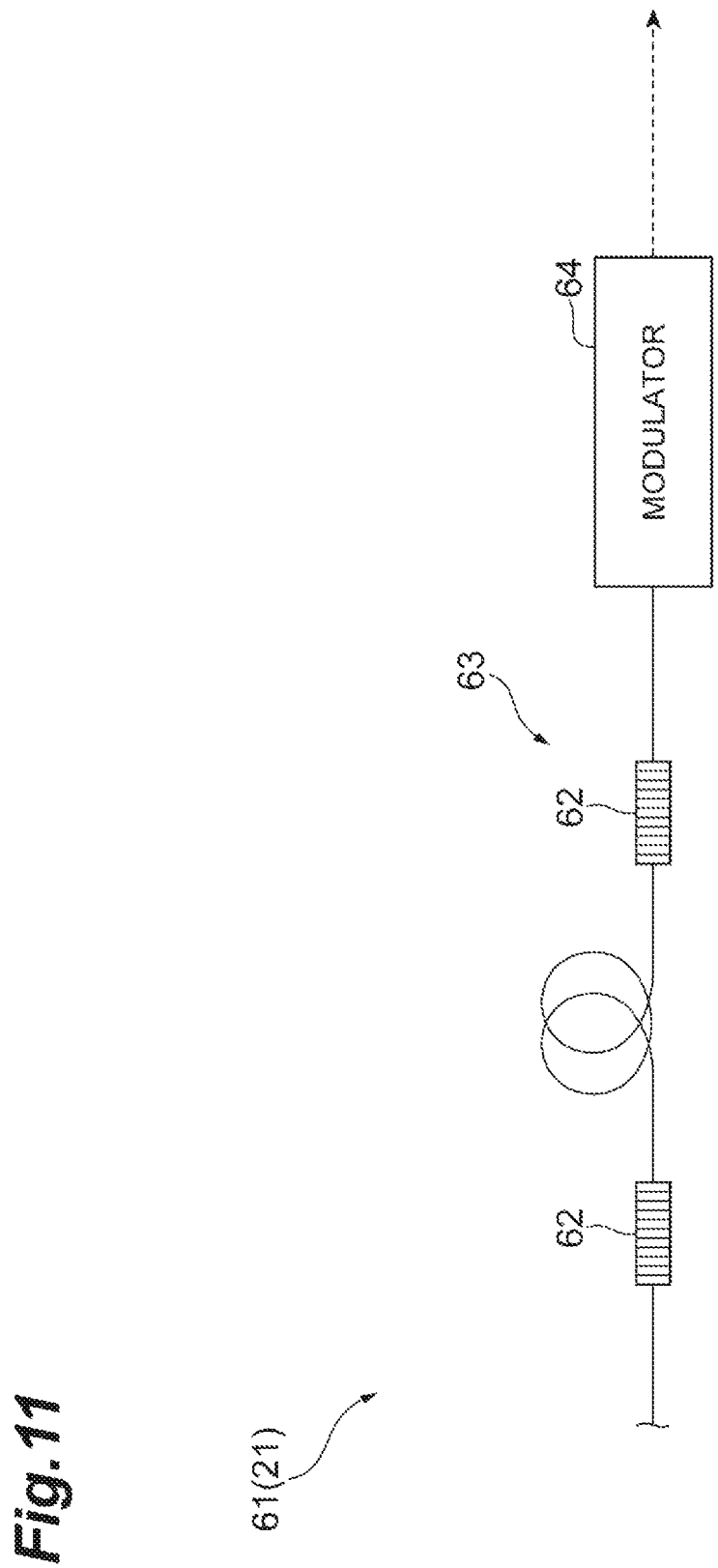
FIG. 11 is a view illustrating another modification example of a configuration of a light source.

In addition, for example, as illustrated in FIG. 11, the light source 21 may be a fiber laser 61 having a pair of diffraction gratings 62 and 62 constituting a resonator 63 (an excitation light source is not illustrated). In this case, the diffraction grating 62 on the output side for laser light constitutes a part of the seed light control unit 13. Rays of laser light having wavelengths different from each other within the gain range of the light amplifying unit 12 can be respectively output from the light sources 21 by varying the wavelength dependency of the coefficient of transmission of the diffraction grating 62 on this output side for each of the light sources 21. A modulator 64 such as an electro-optical modulator or an acousto-optical modulator is disposed in the rear stage of the fiber laser 61, so that output laser light is pulsed.

Figure 12:
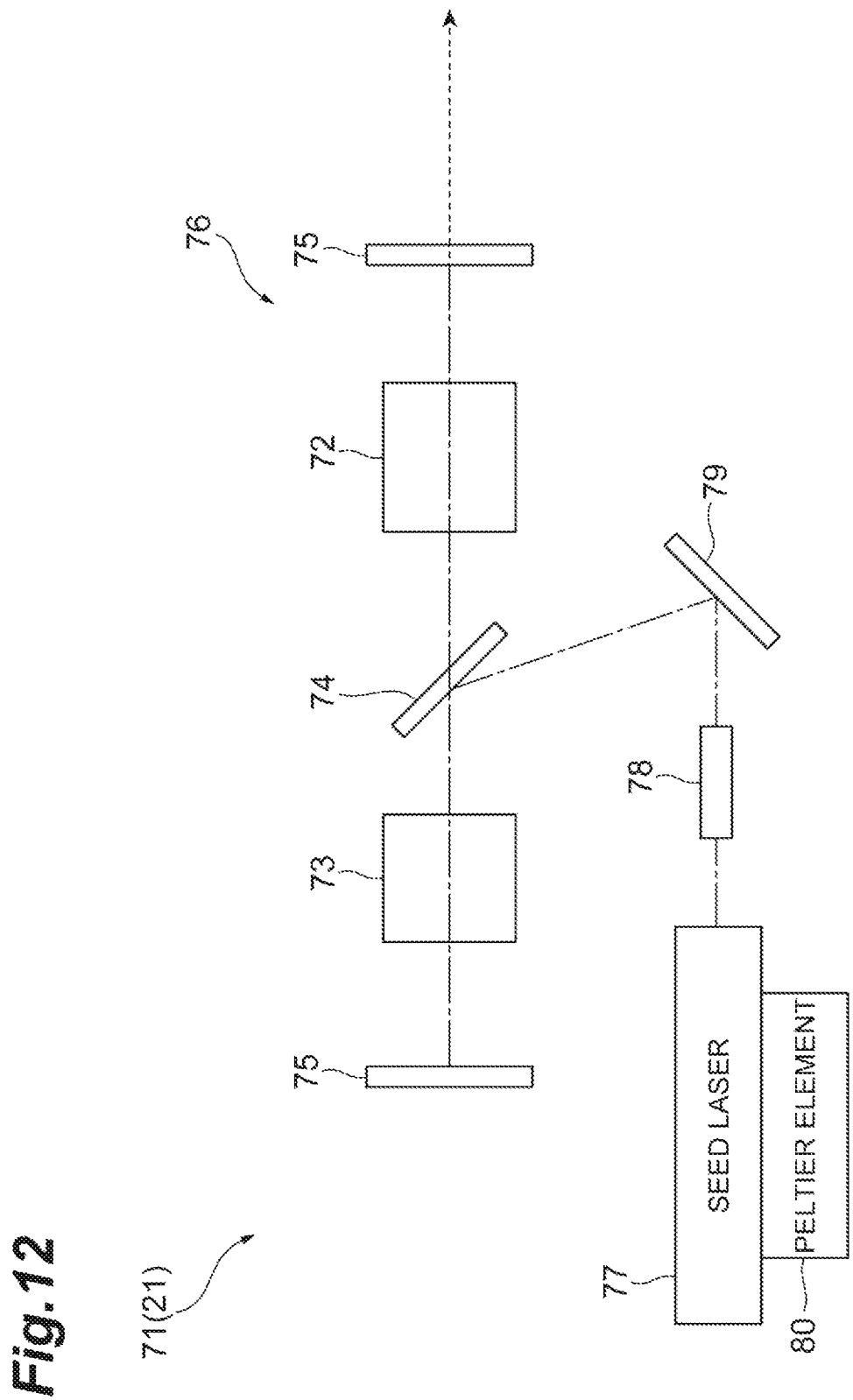
FIG. 12 is a view illustrating another modification example of a configuration of a light source.

In addition, for example, as illustrated in FIG. 12, the light source 21 may be an injection-locked Q-switched laser 71 (an excitation light source is not illustrated). For example, the injection-locked Q-switched laser 71 has a resonator 76 in which a gain medium 72, an electro-optical element 73, and a polarizer 74 are interposed between resonator mirrors 75 and 75. In addition, a seed laser 77 used for oscillation of the injection-locked Q-switched laser 71 is disposed outside the resonator 76. Light output from the seed laser 77 passes through an isolator 78, is reflected by a mirror 79, and is guided into the resonator 76 via the polarizer 74.

For example, the seed laser 77 is a semiconductor laser capable of performing temperature control using a temperature control element such as a Peltier element 80. In this case, the Peltier element 80 constitutes a part of the seed light control unit 13. The wavelength of light output from the seed laser 77 can be controlled by controlling the temperature of the seed laser 77 using the Peltier element 80. The wavelength of light output from the injection-locked Q-switched laser 71 changes in accordance with the wavelength of the seed laser 77. Therefore, rays of laser light having wavelengths different from each other within the gain range of the light amplifying unit 12 can be respectively output from the light sources 21 by controlling the temperature of the seed laser 77. Even in each of the foregoing modification examples, the intensity-time waveform of the seed light L1 can be accurately controlled.

Figure 13:
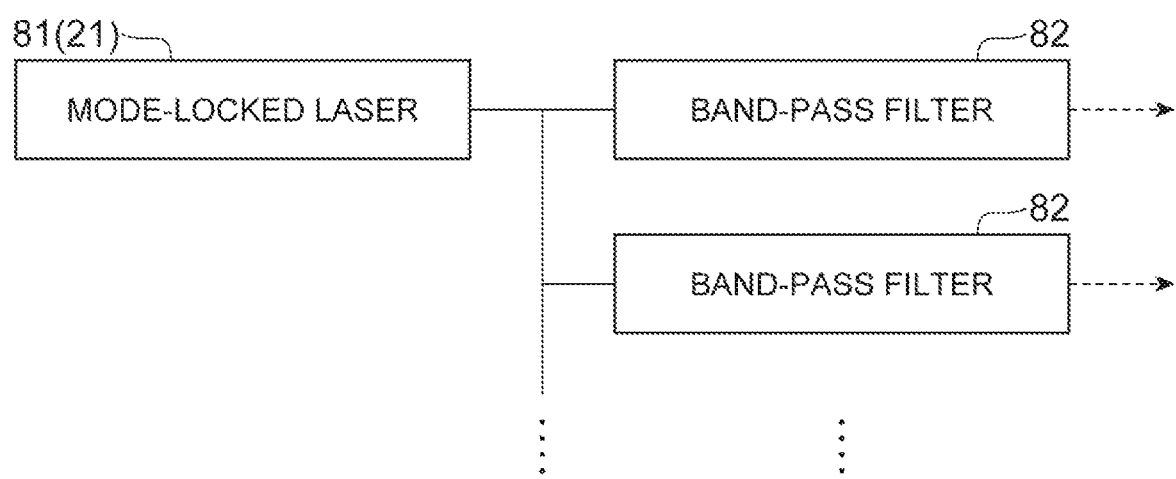
FIG. 13 is a view illustrating another modification example of a configuration of a light source.

In the foregoing embodiment, the light source unit 14 is constituted of a plurality of light sources 21 and the couplers 22. However, the light source unit 14 may be constituted of a single light source 21 outputting rays of light with a plurality of wavelengths included in the seed light L1, while the couplers 22 are omitted. In this case, for example, as illustrated in FIG. 13, a mode-locked laser 81 can be used as the light source 21. As an element constituting a part of the seed light control unit 13, a plurality of band-pass filters 82 having bands different from each other are disposed on the rear stage side of the mode-locked laser 81. When each of the band-pass filters 82 extracts a part of the spectrum included in light output from the mode-locked laser 81, rays of laser light having wavelengths different from each other within the gain range of the light amplifying unit 12 can be respectively output from the light sources 21.

When this configuration is employed, for example, the timings for rays of light with different wavelengths can be controlled by applying optical path differences different from each other to rays of light respectively output from the band-pass filters 82. For example, the optical path difference may be formed by using optical fibers having different lengths in an optical system including the band-pass filter 82 or may be formed by adopting a delay circuit using a corner cube or the like. In this modification example as well, rays of light with a plurality of wavelengths lying within the gain range of the light amplifying unit 12 can be generated as the seed light L1, with a simple configuration. In addition, the intensity-time waveform of the seed light L1 can be accurately controlled.

REFERENCE SIGNS LIST

1 Laser device
11 Output unit
12 Light amplifying unit
13 Seed light control unit
14 Light source unit
21 Light source
22 Coupler (multiplexing unit)
23 Semiconductor laser
24 Peltier element (temperature control element)
51 Solid-state laser
53 Resonator mirror (output mirror)
54 Resonator
61 Fiber laser
62 Diffraction grating 63 Resonator
71 Injection-locked Q-switched laser
77 Seed laser
80 Peltier element (temperature control element)
81 Mode-locked laser
82 Band-pass filter
L1 Seed light

The invention claimed is:

1. A laser device comprising:
an output unit configured to output seed light to a light amplifying unit;
a light amplifying unit configured to amplify an intensity of the seed light output from the output unit,
wherein the output unit comprises:
  a light source unit configured to output, as the seed light, rays of light with a plurality of wavelengths lying within a gain range of the light amplifying unit, and
  a seed light control unit configured to control an intensity-time waveform of the seed light output from the light source unit, wherein intensity time waveforms of each light of the plurality of wavelengths constituting seed light are controlled by the seed light control unit; and
a light detecting unit which monitors the intensity-time waveform of the amplified light and outputs the measurement to the seed light control unit.

2. The laser device according to claim 1,
wherein the light source unit comprises:
  a plurality of light sources configured to respectively output rays of light with the wavelengths included in the seed light, and
  one or a plurality of multiplexing units configured to generate the seed light by multiplexing rays of light output from the plurality of light sources.

3. The laser device according to claim 2,
wherein the plurality of light sources is a semiconductor laser, and
wherein the seed light control unit includes a temperature control element configured to
control a temperature of the semiconductor laser.

4. The laser device according to claim 2,
wherein the plurality of light sources is a solid-state laser, and
wherein the seed light control unit includes an output mirror configured to constitute a resonator of the solid-state laser.

5. The laser device according to claim 2,
wherein the plurality of light sources is a fiber laser, and
wherein the seed light control unit includes a diffraction grating configured to constitute a resonator of the fiber laser.

6. The laser device according to claim 2,
wherein the plurality of light sources is an injection-locked Q-switched laser, and
wherein the seed light control unit includes a temperature control element configured to control a temperature of a seed laser used for oscillating the injection-locked Q-switched laser.

7. The laser device according to claim 1, wherein the light source unit comprises:
  a single light source configured to output rays of light with a plurality of wavelengths included in the seed light.

8. The laser device according to claim 7,
wherein the single light source is a mode-locked laser, and
wherein the seed light control unit includes a band-pass filter configured to extract a part of an oscillation spectrum of the mode-locked laser.

9. A method for controlling a waveform of seed light to a light amplifying unit, the method comprising:
outputting, as the seed light, rays of light with a plurality of wavelengths lying within a gain range of the light amplifying unit; and
controlling an intensity-time waveform of the seed light, wherein intensity time waveforms of each light of the plurality of wavelengths constituting seed light.

* * * * *